(12) United States Patent
Haub

(10) Patent No.: US 7,832,932 B2
(45) Date of Patent: Nov. 16, 2010

(54) LINEAR ROLLING BEARING

(75) Inventor: Alfred Haub, Luelsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 424 days.

(21) Appl. No.: 12/041,165

(22) Filed: Mar. 3, 2008

(65) Prior Publication Data
US 2008/0232726 A1 Sep. 25, 2008

(30) Foreign Application Priority Data
Mar. 21, 2007 (DE) .................. 10 2007 013 516

(51) Int. Cl.
*F16C 29/06* (2006.01)
(52) U.S. Cl. ............................................ 384/45
(58) Field of Classification Search .............. 384/43–45
See application file for complete search history.

(56) References Cited

U.S. PATENT DOCUMENTS

| 4,515,413 | A | * | 5/1985 | Teramachi | 384/45 |
| 5,059,037 | A | * | 10/1991 | Albert | 384/45 |
| 5,097,716 | A | * | 3/1992 | Barbat et al. | 384/45 |
| 5,195,391 | A | * | 3/1993 | Barbat et al. | 384/45 |
| 6,948,851 | B2 | | 9/2005 | Rossteuscher et al. | |
| 7,441,956 | B2 | * | 10/2008 | Koeniger et al. | 384/45 |

FOREIGN PATENT DOCUMENTS

| DE | 34 19 434 | 11/1984 |
| DE | 90 22 444 | 11/1990 |
| DE | 93 13 728 | 11/1993 |
| DE | 103 03 948 | 8/2004 |
| GB | 2 142 098 | 1/1985 |

* cited by examiner

*Primary Examiner*—Thomas R Hannon
(74) *Attorney, Agent, or Firm*—Michael J. Striker

(57) ABSTRACT

A linear roller bearing includes a guide carriage braced longitudinally movably on a guide rail in the axial direction thereof via roller bodies; the guide rail has one bottom face, one top face, and two side faces, which join the bottom face and the top face and on each of which side faces at least one track for roller bodies is located; the guide carriage has two leg parts and one crosspiece joining the two leg parts, so as to embrace the guide rail in essentially a U shape, and at least one roller body race is located in each of the leg parts; and furthermore a roller body race has a load-accepting track, a return track, and curved tracks that join the two tracks, and the load-accepting track of the guide carriage is formed by a raceplate that is parallel to the axial direction of the guide rail and that rests partially on the guide carriage and is braced in rocking fashion about an axis that is approximately perpendicular to the axial direction of the guide rail. The ratio of the thickness of the raceplate to the diameter of the roller body is in a range of from 0.8 to 1.2, and preferably in a range of from 0.8 to 1.1.

12 Claims, 3 Drawing Sheets

LINEAR ROLLING BEARING

CROSS-REFERENCE TO A RELATED APPLICATION

The invention described and claimed hereinbelow is also described in German Patent Application DE 10 2007 013 516.7 filed on Mar. 21, 2007. This German Patent Application, whose subject matter is incorporated here by reference, provides the basis for a claim of priority of invention under 35 U.S.C. 119(a)-(d).

BACKGROUND OF THE INVENTION

The present invention relates to a linear roller bearing. More particularly, the invention relates to a linear roller bearing, including a guide carriage braced longitudinally movably on a guide rail in the axial direction thereof via roller bodies; the guide rail has one bottom face, one top face, and two side faces, which join the bottom face and the top face and on each of which side faces at least one track for roller bodies is located; the guide carriage has two leg parts and one crosspiece joining the two leg parts, so as to embrace the guide rail in essentially a U shape, and at least one roller body race is located in each of the leg parts; and furthermore a roller body race has a load-accepting track, a return track, and curved tracks that join the two tracks, and the load-accepting track of the guide carriage is formed by a raceplate that is parallel to the axial direction of the guide rail and that rests partially on the guide carriage and is braced in rocking fashion about an axis that is approximately perpendicular to the axial direction of the guide rail.

From German Patent Disclosure DE 103 03 948 A1, a linear guide device with a guide rail and a guide carriage movable back and forth on the guide rail in the longitudinal direction thereof is known. A roller body track of the carriage is embodied on a track element that is joined to the guide carriage and that at least on its inlet end has a cantilevered portion, with a length that is at least equal to the diameter of the roller bodies. One disadvantage of this linear guide device is that errors of alignment cannot be compensated for.

From German Utility Model G 90 11 444 U1, a roller bearing is also known which has a main bearing body, guided displaceably on a rail in the axial direction thereof, with one load-transferring row of roller bodies and a return row of roller bodies as well as two rows of curved roller bodies.

In one embodiment of this linear roller bearing, it can be seen that the load-accepting travel grooves of the primary bearing body are located on a raceplate. It can also be seen that the raceplate is curved in convex fashion in the middle portion of its back side, and as a result the raceplate can execute a rocking motion in the complementary groove of the primary bearing body, about an axis that is perpendicular to the longitudinal direction of the rail. By means of this kind of rocking motion, non-planar mounting faces and other errors of alignment can be compensated for, for instance if one and the same higher-order connection part is guided by two primary bearing bodies on one and the same rail, or if one and the same connection part is joined to two primary bearing bodies that are supported on different rails.

This kind of rocking capability based on the convexly curved back side of the raceplate, however, has the consequence in the least favorable case that linear contact exists between the raceplate and the primary bearing body. This linear contact is at the cost of the load-bearing capacity of the linear bearing.

Moreover, the known linear roller bearing has a raceplate of relatively large cross section, which necessitates a relatively large complementary groove in the primary bearing body. Since the groove size is inversely proportional to the rigidity of the linear bearing, narrow limits are set to any increase in the cross section of the raceplate.

SUMMARY OF THE INVENTION

It is the object of the invention to provide a linear roller bearing of the type defined above in such a way that it has a raceplate of reduced cross section.

According to the invention, this object is attained in that the ratio of the thickness of the raceplate to the diameter of the roller body is in a range of from 0.8 to 1.2, and preferably in a range of from 0.8 to 1.1. As a result, the rigidity of the linear bearing is increased, since the complementary groove on the guide carriage can be made smaller.

The thickness of the raceplate should be understood to mean the plumb spacing of the pressure point of the roller body on the load-accepting track of the raceplate from the back face of the raceplate.

The ratio of the length of the raceplate to the diameter of the roller body can be in a range of from 7.0 to 15.0. Preferably, this ratio is between 7.0 and 8.1.

A further advantageous embodiment of the linear roller bearing of the invention can be found if the ratio of the length of the clearance space on the complementary groove of the guide carriage to the diameter of the roller body is in a range of from 2.2 to 3.7, and preferably in a range of from 2.2 to 3.4, and the ratio of the depth of the clearance space on the complementary groove of the guide carriage to the diameter of the roller body is in a range of from 0.02 to 0.07. As a result, the balls can run without impact into the load-accepting track, and hence the rolling precision of the linear roller bearing is increased, and fluctuations in frictional force are reduced.

In a preferred embodiment, the ratio of the length of the contact face of the guide carriage to the diameter of the roller body can be in a range of from 0.8 to 2.7, preferably of from 1.4 to 2.7. The load-bearing capacity of the linear bearing is thus increased.

An advantageous refinement of the invention can be found in that the ratio of the width of the contact face on the guide carriage to the diameter of the roller body is in a range of from 0.3 to 1.1, and preferably of from 0.3 to 0.6. Once again, this increases the load-bearing capacity of the linear bearing.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
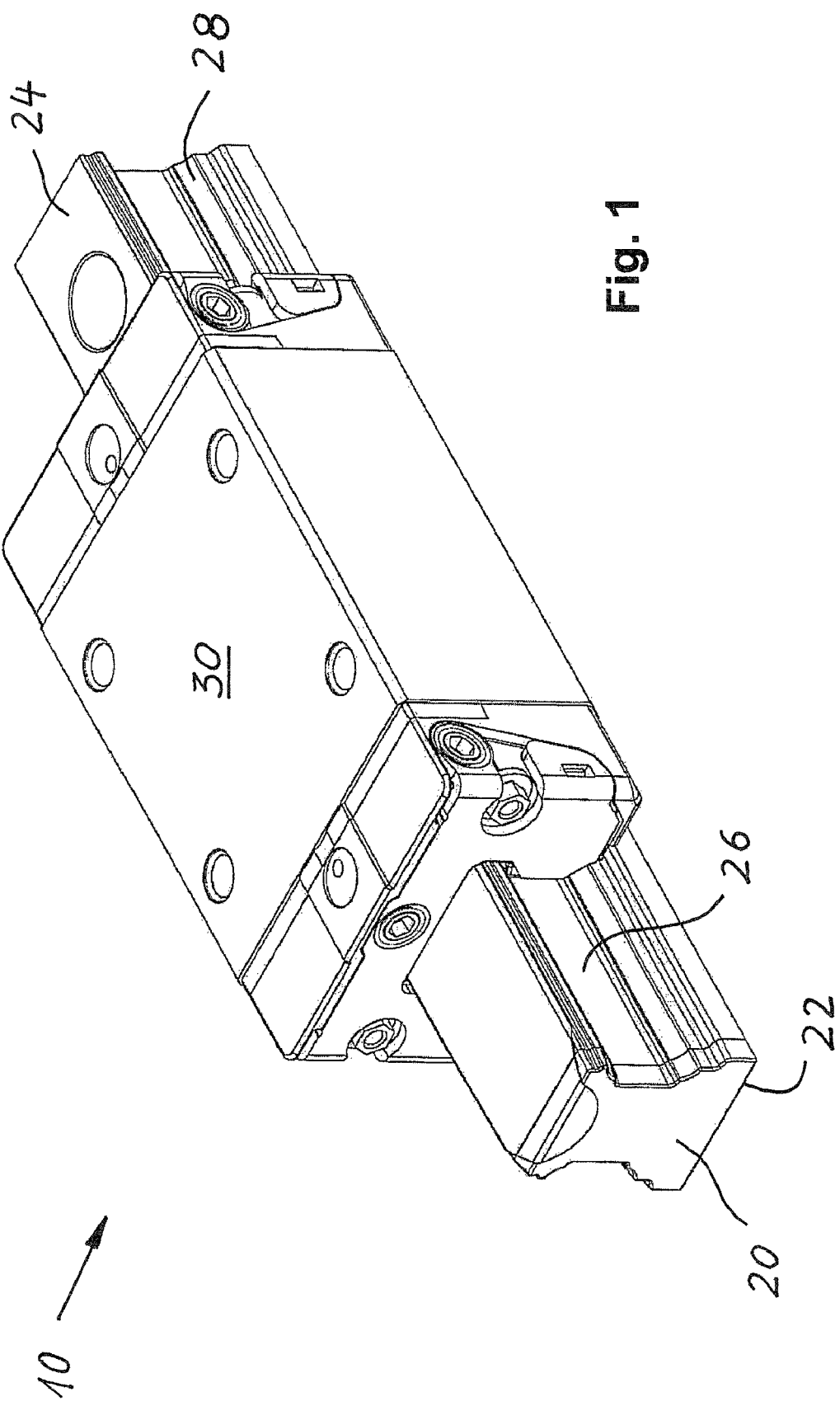
FIG. 1 is a perspective view of the linear roller bearing.

FIG. 1 shows a linear roller bearing 10 according to the invention, with a guide rail 20 and with a guide carriage 30 supported displaceably in the axial direction of the guide rail via roller bodies, not shown.

The guide rail 20 has a bottom face 22, with which it can be secured to a base, not shown; a top face 24; and two side faces 26. Over the entire length of the guide rail 20 and parallel to its axial direction, tracks 28 for roller bodies, such as balls, are located on the side faces 26.

The guide carriage 30 has two leg regions and one crosspiece region, joining the two leg regions, so that the guide rail 20 is embraced in essentially U-shaped fashion by the guide carriage 30.

Roller body races, each with one load-accepting and one returning track that are joined together into an endless loop via two curved tracks, are received in the guide carriage 30. The load-accepting track is formed by a raceplate 40 (FIG. 2) extending parallel to the axial direction of the guide rail 20 and rests at least partially on the guide carriage 30 and is braced in rocking fashion about an axis extending essentially orthogonally to the axial direction of the guide rail 20.

Figure 2:
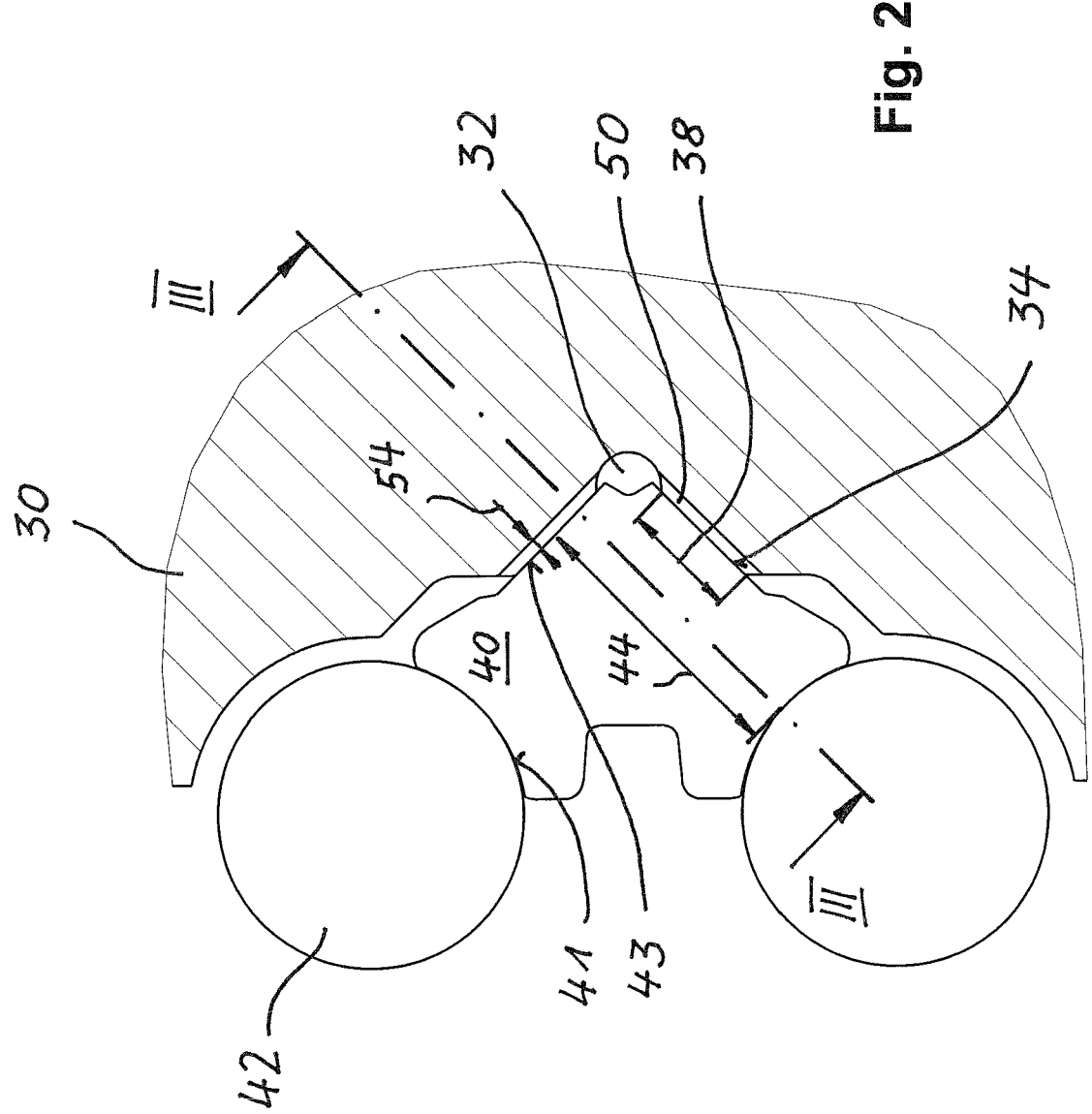
FIG. 2 is an end view of the raceplate in the guide carriage.

FIG. 2 shows a detail of an end view of a raceplate 40 in the guide carriage 30. Two tracks 41 for balls 42 are embodied on the raceplate 40 and have a radius of curvature slightly larger than the radius of the balls. For instance, the radius of curvature of the track 41 may be in a range that is from 0.5 to 0.505 times the diameter of the ball 42.

The raceplate 40 is also equipped with two back faces 43, which correspond to two contact faces 34 of the complementary groove 32 in the guide carriage 30. The arrangement of the raceplate 40 in the groove 32 is embodied so as to be able to accept loads from all directions. The tracks 41, or contact points of the rolling partners, are therefore located at a pressure angle of 45°, for instance.

The raceplate 40 has a thickness 44, which is defined as the plumb spacing of the pressure point of the ball 42 on the load-accepting track 41 from the back face 43 of the raceplate 40.

The ratio of the thickness 44 of the raceplate 40 to the diameter of the ball 42 is in a range of from 0.8 to 1.2, preferably in a range of from 0.8 to 1.1.

From FIG. 2, the width 38 of the contact face 34 of the guide carriage 30 can also be seen. The ratio of the width 38 of the contact face 34 on the guide carriage 30 to the diameter of the ball 42 is in a range of from 0.3 to 1.1, and preferably in a range of from 0.3 to 0.6.

Figure 3:
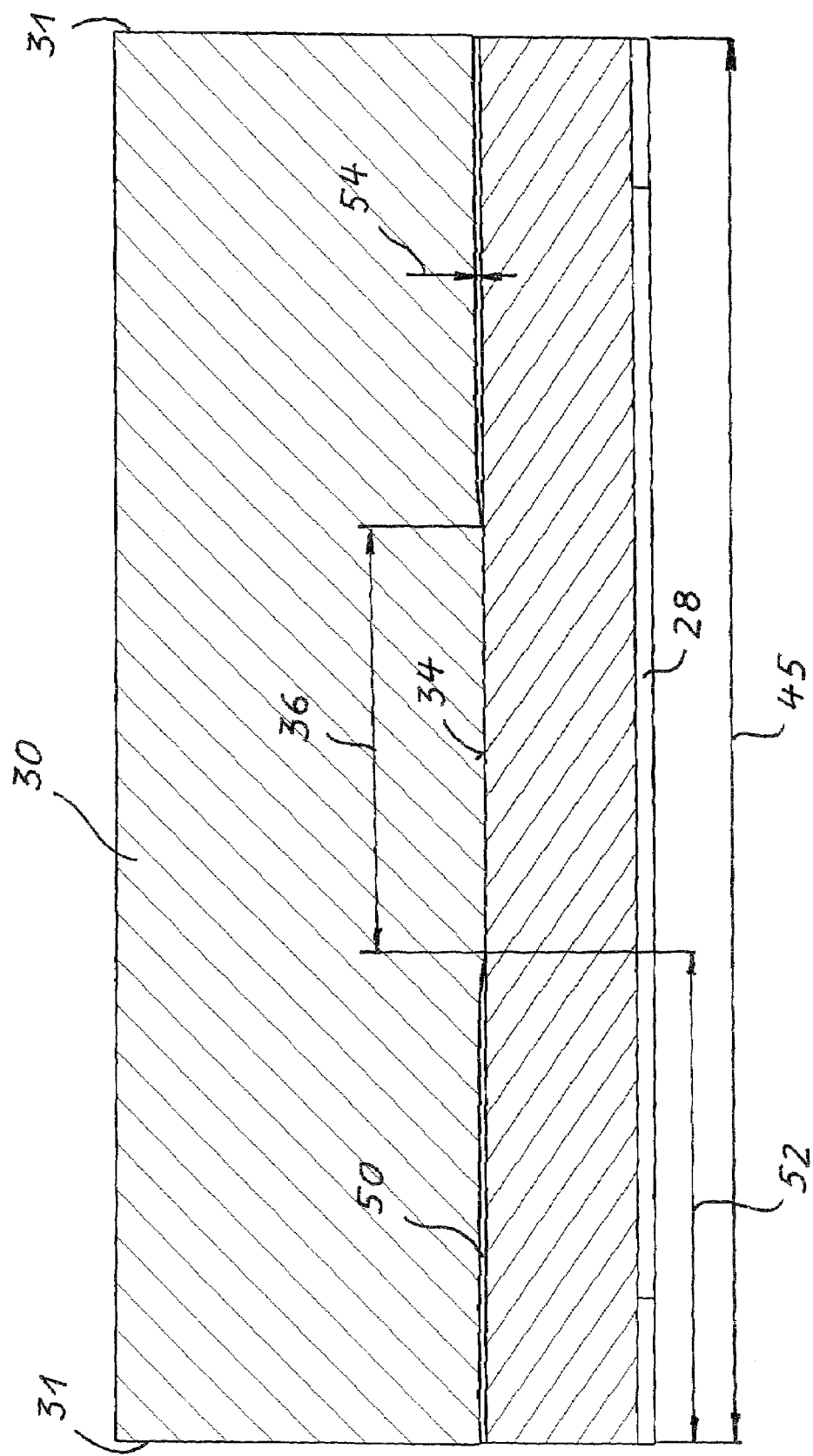
FIG. 3 is a simplified sectional view through the guide carriage, taken along the line III-III in FIG. 2.

FIG. 3 shows a simplified longitudinal section, which shows that the raceplate 40 has essentially the same length as the guide carriage 30. The ratio of the length 45 of the raceplate 40 to the diameter of the ball 42 is in a range of from 7.0 to 15.0, and preferably in a range of from 7.0 to 8.1.

It can also be seen from FIG. 3 that the raceplate 40 does not rest entirely on the guide carriage 30, but rather only in the region of the contact face 34. The ratio of the length 36 of the contact face 34 on the guide carriage 30 to the diameter of the ball 42 is in a range of from 0.8 to 2.7, and preferably in a range of from 1.4 to 2.7.

Since the contact face 34 extends not over the entire length of the guide carriage 30 but rather only over a middle region of the complementary groove 32, one clearance space 50 each is formed, beginning at each face end 31 of the guide carriage 30, and this clearance space has a defined length 52 and a defined depth 54. On the one hand, the ratio of the length 52 of the clearance space 50 on the complementary groove 32 of the guide carriage 30 to the diameter of the ball 42 is in a range of from 2.2 to 3.7, and preferably in a range of from 2.2 to 3.4. On the other hand, the ratio of the depth 54 of the clearance space 50 on the complementary groove 32 of the guide carriage 30 to the diameter of the ball 42 is in a range of from 0.02 to 0.07.

The invention is not limited in its embodiment to the preferred exemplary embodiment described above. On the contrary, a number of variants are conceivable that make use of the version shown, even for embodiments of fundamentally different types.

It will be understood that each of the elements described above, or two or more together, may also find a useful application in other types of constructions differing from the type described above.

While the invention has been illustrated and described as embodied in a linear roller bearing, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claim.

1. A linear roller bearing, comprising:
   a guide rail;
   a guide carriage braced longitudinally movably on a guide rail in an axial direction via roller bodies, said guide rail having one bottom face, one top face, and two side faces, which join said bottom face and said top face;
   at least one track for the roller bodies located on each of said side faces, said guide carriage having two leg parts and one cross piece joining said two leg parts so as to embrace said guide rail in substantially a U-shape; and
   at least one roller bearing race located in each of said leg parts and having a load-accepting track, a return track, and curved tracks that join said two tracks, said load-accepting track of said guide carriage being formed by a raceplate that is parallel to said axial direction of said guide rail and rests partially on said guide carriage and braced in rocking fashion about an axis that is substantially perpendicular to said axial direction of guide rail, wherein a ratio of a thickness of said raceplate to a diameter of said roller body is in a range of 0.8 to 1.2.

2. A linear roller bearing as defined in claim 1, wherein said ratio of the thickness of said raceplate to the diameter of said roller body is in a range of 0.8 to 1.1.

3. A linear roller bearing as defined in claim 1, wherein a ratio of a length of said raceplate to a diameter of said roller body is in a range of 7.0 to 15.0.

4. A linear roller bearing as defined in claim 3, wherein said ratio of said length of said raceplate to said diameter of said roller body is in a range from 7.0 to 8.1.

5. A linear roller bearing as defined in claim 1, wherein a ratio of a length of a clearance space on a complementary groove of said guide carriage to a diameter of said roller body is in a range from 2.2 to 3.7.

6. A linear roller bearing as defined in claim 5, wherein said ratio of said length of said clearance space on said complementary groove of said guide carriage to said diameter of said roller body is in a range from 2.2 to 3.4.

7. A linear roller bearing as defined in claim 1, wherein a ratio of a depth of a clearance space of a complementary groove of said guide carriage to a diameter of said roller body is in a range from 0.02 to 0.07.

8. A linear roller bearing as defined in claim 1, wherein a ratio of a length of a contact face of said guide carriage to a diameter of said roller body is in a range from 0.8 to 2.7.

9. A linear roller bearing as defined in claim 8, wherein said ratio of said length of said contact face of said guide carriage to said diameter of said roller body is in a range from 1.4 to 2.7.

10. A linear roller bearing as defined in claim 1, wherein a ratio of a width of a contact face on said guide carriage to a diameter of said roller body is in a range from 0.3 to 1.1.

11. A linear roller bearing as defined in claim 10, wherein said ratio of said contact face of said guide carriage to said diameter of said roller body is in a range from 0.3 to 0.6.

12. A linear roller bearing as defined in claim 1, wherein said roller bodies are configured as balls.

* * * * *